United States Patent [19]
Galbi et al.

[11] Patent Number: 5,568,167
[45] Date of Patent: Oct. 22, 1996

[54] SYSTEM FOR PROVIDING ANTIALIASED VIDEO OVERLAYS

[75] Inventors: David E. Galbi, Sunnyvale; Stephen C. Purcell, Mountain View, both of Calif.

[73] Assignee: C-Cube Microsystems, Inc., Milpitas, Calif.

[21] Appl. No.: 311,670

[22] Filed: Sep. 23, 1994

[51] Int. Cl.⁶ .................................................. H04N 9/74
[52] U.S. Cl. .................... 348/589; 348/595; 348/563; 348/600; 345/136
[58] Field of Search ........................ 348/595, 589, 348/563, 600; 84/610, 631, 634, 477 R, DIG. 6; 434/307 A; 345/136, 144; 382/269; H04N 9/74

[56] References Cited

U.S. PATENT DOCUMENTS 5,260,695 11/1993 Gengler et al. ........................ 348/595
5,282,037 1/1994 Eguchi et al. ........................ 348/595

*Primary Examiner*—Victor R. Kostak
*Assistant Examiner*—Nathan J. Flynn
*Attorney, Agent, or Firm*—Skjerven, Morrill, MacPherson, Franklin & Friel; Edward C. Kwok

[57] ABSTRACT

A separate data stream allows encoding of an overlay image, which is to be superimposed on images of a video sequence. The pixels of the overlay image can be transparent or have a text color, a shadow color, or an intermediate color either between the text color and the shadow color, or between the shadow color and the color of the corresponding pixel in the underlying video image. The intermediate colors provide for antialiasing. In addition, a color selection circuit allows selection of the next color from a pool of 9 colors, using a 3-bit field.

21 Claims, 11 Drawing Sheets

|  | PREVIOUS COLOR | COLOR SELECT | NEW COLOR |
|---|---|---|---|
| CASE 1 | 0,A[2:0] | 0 0 0 | 1 0 0 0 |
| CASE 2 | 0,A[2:0] | B[2:0] | 0,A[2:0] ⊕ B[2:0] |
| CASE 3 | 1 0 0 0 | B[2:0] | 0,B[2:0] |

NEW COLOR     (C[3:0]) = (B[2:0]==0 & $\overline{A[3]}$) ? 8 : A[2:0] ⊕ B[2:0]
COLOR SELECT  (B[2:0]) = (C[3:0]==8)      ? 0 : C[2:0] ⊕ A[2:0]

FIG. 5A

| | |
|---|---|
| 0 | GET NEXT 8 BITS |
| 1 | GET NEXT 4 BITS (A) |
| 2 | GET NEXT 4 BITS (B) |
| 3 | COLOR=7, RUN=2 |
| 4 | COLOR=6, RUN=2 |
| 5 | COLOR=4, RUN=2 |
| 6 | COLOR=4, RUN=3 |
| 7 | COLOR=4, RUN=4 |

FIG. 5B

| SECOND 4 BITS | CODE A: COLOR | RUN | CODE B: COLOR | RUN |
|---|---|---|---|---|
| 0 | 8 | 9 | 8 | 11 |
| 1 | 0 | 2 | 8 | 2 |
| 2 | 0 | 3 | 8 | 3 |
| 3 | 0 | 4 | 8 | 4 |
| 4 | 0 | 5 | 8 | 5 |
| 5 | 0 | 6 | 8 | 6 |
| 6 | 0 | 7 | 8 | 7 |
| 7 | 0 | 8 | 8 | 8 |
| 8 | 0 | 9 | 4 | 9 |
| 9 | 0 | 10 | 4 | 10 |
| 10 | 0 | 11 | 4 | 11 |
| 11 | 0 | 12 | 8 | 10 |
| 12 | 5 | 2 | 4 | 5 |
| 13 | 1 | 2 | 4 | 6 |
| 14 | 2 | 2 | 4 | 7 |
| 15 | 3 | 2 | 4 | 8 |

SYSTEM FOR PROVIDING ANTIALIASED VIDEO OVERLAYS

BACKGROUND OF THE INVENTION

1. Field of the Invention

The present invention relates to techniques for image processing; and in particular, relates to techniques for overlaying a textual image on a video image.

2. Discussion of the Related Art

In many video applications, a text overlay is often used to superimpose textual information onto a video image. Such a text overlay is used, for example, in a motion picture dubbed in one language, to provide subtitles in a different language. As another example, in a karaoke music video sequence, the lyrics of a song are presented in such text overlays to allow the participants of the karaoke to follow the song in synchrony with the video sequence.

Data compression is used in virtually all video image processing because of the tremendous savings in storage requirements achievable without perceptibly compromising image quality. Many data compression standards have been proposed and used in the industry. In particular, the MPEG (Motion Picture Expert Group) standard has been widely adopted. Algorithms under the MPEG standard perform both interframe and intraframe image compressions. Image processing integrated circuits, which support MPEG compression and decompression algorithms, are available in the market place.

SUMMARY OF THE INVENTION

In accordance with the present invention, a system for superimposing a lyrics overlay image on a video image is provided. The system includes: (a) a first input circuit for receiving a first data stream of symbols, each symbol encoding, by reference to a color map, one or more pixels of the lyrics overlay image; (b) a second input circuit for receiving a second data stream including color intensity values of pixels of the video image; (c) a decoding circuit receiving the first data stream of symbols and providing, from consulting the color map of each symbol, a third data stream including color intensity values of the pixels of the lyrics overlay image; and (d) an image blending circuit receiving the first and third data streams, the image blending circuit providing a fourth data stream which consists of the blended image in the form of weighted sums of color intensity values in the second and third data streams.

In one embodiment, each of the symbols of the first data stream encodes pixels in the lyrics overlay image as a color selected from the color map, together with a run length specifying the number of consecutive pixels having the selected color. In that embodiment, the symbols are of unequal lengths. Further, to achieve antialiasing at the boundary between a text color and a shadow color, the image blending circuit receives (i) a first color intensity value corresponding to the shadow color; and (ii) a second color intensity value corresponding to the text color or the video background color, and derives color intensity values of pixels at that boundary using weighted averages of the first and second color intensities received.

The system of the present invention further receives a fade factor, which is used to provide weighted sums of pixels of the video image and blended and antialiased pixels of the overlay lyrics image, to achieve "fading in" and "fading out" effects, in accordance with the value of the fade factor.

In accordance with another aspect of the present invention, a method is provided for encoding in a data stream a sequence of items using n-bit symbols, where each item is selected from a group of $2^n+1$ items. This method of the present invention includes the steps of: (a) assigning an index to each item, except a designated item, where each index is one of the bit patterns '$0a_{n-1}a_{n-2}\ldots a_0$', and each of the $a_i$'s takes on values '1 or '1, i being an index between 0 and n, inclusive; (b) assigning the bit pattern '$1b_{n-1}b_{n-2}\ldots b_0$ as the designated index of the designated item, where each of the $b_j$'s takes on the value '0, and j is an index between 0 and n, inclusive; and (c) designating one of the items as an initial item, and providing in the data stream, (i) for each item in the sequence, other than the designated item, a symbol having the value of the least significant n bits obtained by a bitwise exclusive-or operation using the index of the item and the index of the immediately preceding item (the initial item is used as the first of the immediately preceding item); and (ii) for each occurrence of the designated item in the sequence, a designated symbol which is the bit pattern $b_{n-1}b_{n-2}\ldots b_0$, where each of the $b_j$'s takes on the value '0, and j is an index between 0 and n, inclusive.

Decoding the data stream of the above encoding method is provided by the following steps: (a) receiving the data stream and retrieving from the data stream the encoded symbols; and (b) recovering the sequence of items from the data stream, by (i) obtaining the index corresponding to each symbol, other than the designated symbol, by applying a bitwise exclusive-or operation of the symbol with the least significant n bits of the index the immediately preceding item (again, using the initial item as the first of the immediately preceding item); and (ii) for each designated symbol, the index of the designated item.

In one embodiment, where nine colors are encoded using a 3-bit color select field of the present invention, variable-length symbols incorporating the 3-bit color select field are provided for encoding multiple pixels as color and run-length pairs. In that embodiment, variable-length symbols are designed to be multiples of four bits, to simplify the decoding hardware.

Because the present invention compresses the video image separately from the overlay text images, quality of the video image is improved over the prior art which blends the text overlay image and the underlying video image prior to compression. In addition, because the video sequence and the text overlay sequence are separately stored, the text overlay sequence can be turned off at will. Further, by storing multiple editions of text overlay sequences with the same video sequence, a video sequence can be used with any of a multiplicity of text overlay sequences. In many applications, associating multiple text overlays with a single video image is useful, for example, to provide subtitles in multiple languages. In a karaoke application, such technique can be used to associate multiple song lyrics with the same video sequence.

The present invention is better understood upon consideration of the detailed description below and the accompanying drawings.

BRIEF DESCRIPTION OF THE DRAWINGS

FIG. 1b illustrates the data formats of an overlay image ("pixel data"), such as overlay image 105 of the lyric packet of FIG. 1a.

FIG. 5*a* is a table showing the algorithm for deriving the next color, given a current color and a 3-bit color select code.

FIG. 5*b* is a decoding table for decoding the first three bits of a symbol.

FIG. 5*c* is a decoding table for decoding the second four bits of a symbol under either symbol format or symbol format 404.

DETAILED DESCRIPTION OF THE PREFERRED EMBODIMENTS

One embodiment of the present invention can be implemented on an integrated circuit with customized features to support display of lyrics in an karaoke application. Thus, in the remaining detailed description, text overlay data are sometimes referred to as "lyrics" data or a lyrics sequence. However, upon consideration of this detailed description and the accompanying drawings, one of ordinary skill would appreciate that the present invention is equally applicable to any video application in which a video sequence, such as a series of text overlays, is superimposed onto an underlying video sequence.

The present embodiment of the present invention is implemented as a feature in an MPEG decoder integrated circuit. An example of such an integrated circuit is disclosed in a first copending patent application, assigned to C-Cube Microsystems, which is also the assignee of the present invention, entitled "Decompression Processor for Video Applications" by S. Purcell et al, Ser. No. 08/046,474, filed on Apr. 13, 1993, which is a file-wrapper continuation of Ser. No. 07/669,818, now abandoned. The present embodiment decodes video data encoded under the MPEG standard, in accordance with the format described below. A programmable MPEG encoder, which can be programmed to provide the encoded video format described below is disclosed in a second copending patent application, also assigned to C-Cube Microsystems, entitled "Structure and Standard for a Multi-Standard Video Encoder/Decoder", by S. Purcell et al, Ser. No. 08/105,253, filed on Aug. 9, 1993. The detailed descriptions of the MPEG decoder and encoder integrated circuits in the above first and second copending patent applications are hereby incorporated by reference.

An embodiment of the present invention retrieves a video sequence and its associated lyrics sequence from a compact disk (CD). The format of the lyrics sequence is described in further detail in the following. In a "double speed" CD, the present invention can associate, for example, four audio streams and four lyrics streams with each video stream. Each lyric stream stores packets of data representing one or more lyrics sequences to be superimposed in synchrony with a video sequence stored in a video stream.

Figure 2:
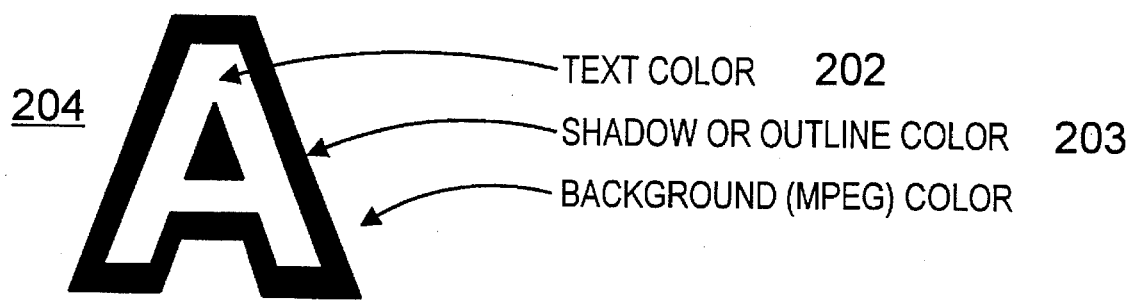
FIG. 2 illustrates the use of "text", "outline" and "transparent" colors to display a text character achievable under the "compressed lines" format.

FIG. 2 illustrates the superposition of an image in an overlay lyrics sequence onto an image of a video sequence. FIG. 2 shows a character "A" superimposed onto a decompressed underlying video image. Each pixel in portion 202 ("text pixel") is displayed in a text color. In the present embodiment, a text pixel is displayed in one of two text colors, depending on whether the pixel is to the left or to the right of a "color switch position". The color switch position is used in a karaoke application to indicate to the karaoke user the current position in the lyrics of the song being played. The text pixels in portion 202 are separated from the underlying MPEG video image by a region 203 of "shadow" or "outline" color ("shadow pixels"). As in the text pixels, each shadow pixel is displayed in one of two shadow colors, determined by whether the pixel is to the left or to the right of the color switch position. Finally, whenever a portion of the lyrics image is to be hidden, the pixels in such a portion are made "transparent". A transparent pixel takes on the color of the pixel occupying a corresponding position in the decoded underlying video image.

In one embodiment, a lyric sequence or stream is stored on a CD in a private stream of an MPEG system stream. Within the private stream is stored one or more lyric sequences. Each lyric sequence is provided with multiple packets. The format of each lyric packet is next described with reference to FIGS. 1*a*–1*e*. In the following description, unless otherwise stated, a "word" refers to a 16-bit unit of data.

Figure 1A:
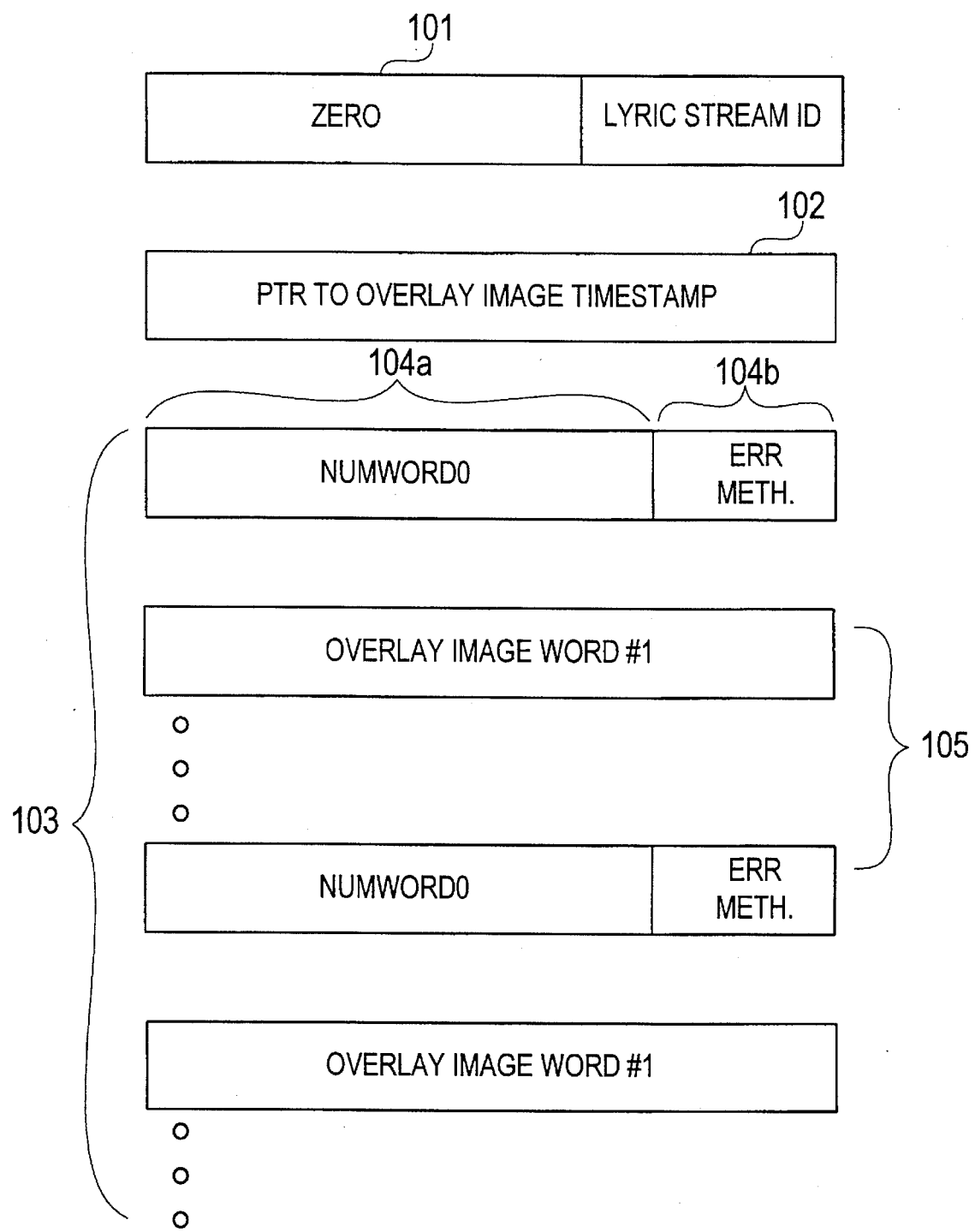
FIG. 1a illustrates the overall format of a lyric packet.

FIG. 1*a* illustrates the format of a lyric packet. As shown in FIG. 1*a*, the first word (labelled 101) of each lyric packet identifies the lyric stream. Currently, a lyric stream is identified by a value between 0 to 31. Thus, if word 101 of a packet has a value outside of 0 to 31, the packet does not encode a lyric packet. The second word (labelled 102) of a lyric packet provides as an offset value the location of a time stamp within the lyric packet. Word 102 facilitates synchronization of the overlay image to both the video image and the audio stream, when a random access method is used to access the overlay data. If the value in word 102 references a location outside of the packet, no overlay image time stamp is assumed to exist in the lyric packet.

An indefinite number of overlay data sections follow word 102. In FIG. 1*a*, each overlay data section is represented generally by reference numeral 103. Overlay data section 103 consists of (a) a first word, indicated by reference numeral 104, including a 14-bit value "numword0" (labelled 104*a*) and a 2-bit value 104*b* for specifying an "error concealment method"; and (b) a data section 105 containing multiple overlay images. Value 104*a* specifies the number of words in data section 105. Error concealment methods specified by value 104*b* are discussed in further detail below.

Figure 1B:
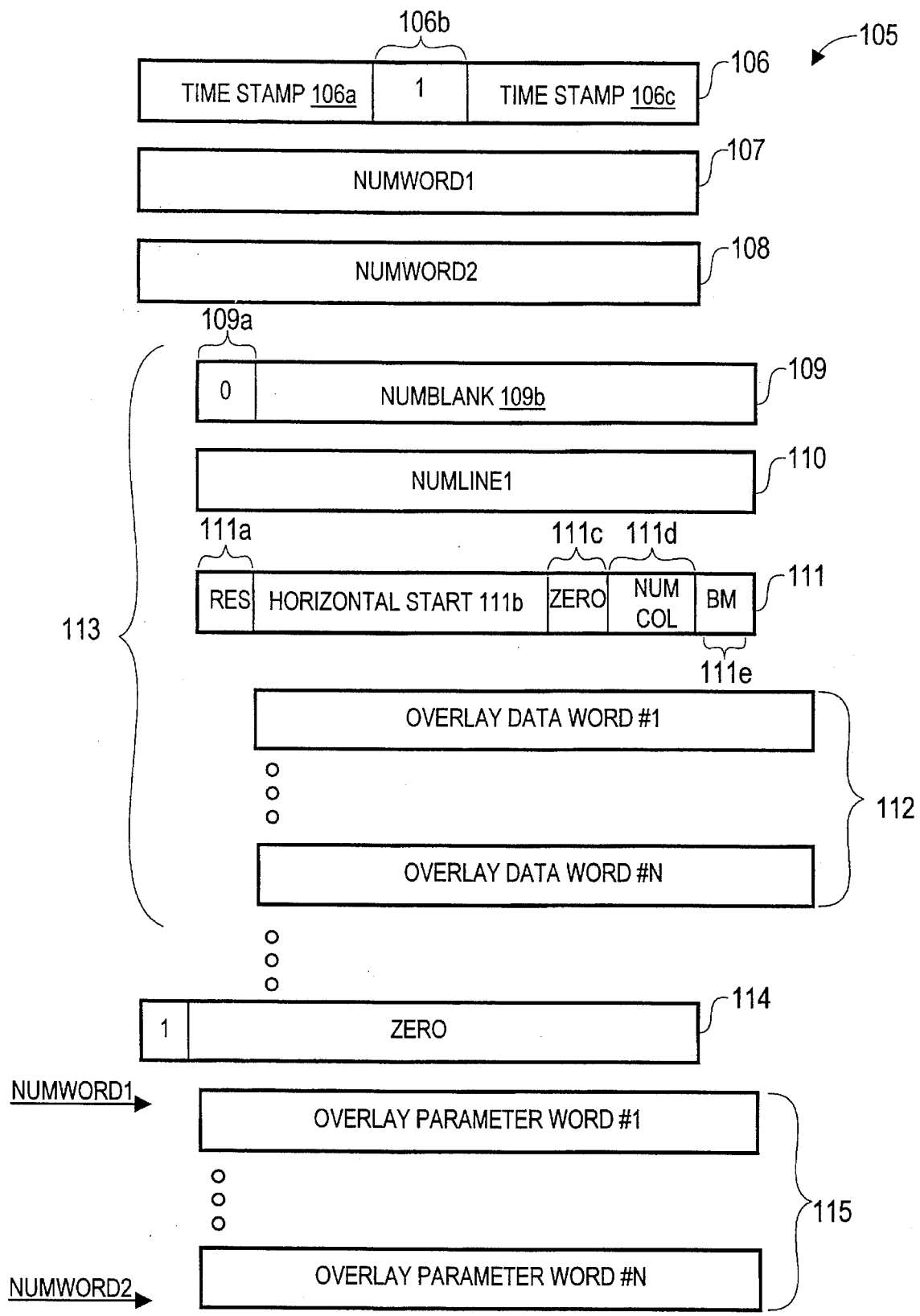

The data formats used in each overlay image of data section 105 are shown in FIG. 1*b*. As shown in FIG. 1*b*, the first word (labelled 106) in data section 105 includes a 15-bit time stamp (occupying bits 15:9 and 7:0 of word 106) and a 1-bit marker bit (bit 8 of word 106)[1]. The overlay image time stamp in word 106 specifies the time period during which the overlay image is displayed. In this embodiment, the time stamp in word 106 has a resolution of about 1/100 seconds and a maximum display period of approximately 46 seconds.

---
[1] Because a long string of zeroes is sometimes used in MPEG to demarcate an error, representation of a legitimate value as a long string of zeroes is avoided. The 1-bit marker bit (106b) so that overlay timestamps have the same format as MPEG timestamps.

A 16-bit value 107 ("numword1") and a 16-bit value 108 ("numword2") follow word 106. Words 107 and 108 provide, respectively, the offset values from their respective positions to the beginning and the end of an overlay parameter section 115 discussed below. Multiple "pixel data" sections follows word 108. The first such pixel data section is denoted in FIG. 1b as section 113.

The first word (labelled 109) of each pixel data section has its most significant bit (bit 15, labelled in FIG 1b as bit 109a) set to 0. Bit 109a is used to denote the beginning of a pixel data section. The first word following the last pixel data section is shown in FIG. 1b as word 114, which has its most significant bit set to 1. Word 114 demarcates the end of pixel data sections and the beginning of the specification of overlay parameter values in each overlay image.

The least significant 15 bits of word 109 is a 15-bit value "numblank" (labelled 109b) which specifies the number of transparent lines preceding the coded overlay image lines to follow. The next word (word 110) specifies the number of coded overlay image lines in the current pixel data section. Word 111, which follows word 110, encodes (a) a 1-bit value (111a) for specifying the resolution of the coded overlay image lines; (b) a 10-bit value (111b, labelled "horizontal start position") for specifying the number of transparent pixels to be inserted before each coded line; (c) a 1-bit value 111d for indicating the number of bits used to specify a pixel under a "bit map" (i.e. uncompressed) format; and (d) a 1-bit value (111e) indicating whether the overlay image lines to follow are encoded in accordance with a "bit map" format or in a "compressed lines" format. In this embodiment, bit 111a specifies a resolution under either the SIF standard or the CCIR 601 standard. Both the SIF and the CCIR 601 standards are known to those skilled in the art In this embodiment, when set to '0', bit 111d specifies two bits per pixel to be used, thereby allowing the use of four "left" colors and four "right" colors.

Following word 111 are multiple overlay image line data sections for encoding groups of overlay image lines. The first of such overlay image line sections is indicated in FIG. 1b by reference numeral 112. The "bit map" and "compressed lines" data formats 112a and 112b are shown respectively as data formats 112a and 112b in FIGS. 1c and 1d.

The overlay image parameter section, which follows word 114, is indicated by reference numeral 115. The data formats of overlay image parameter section 115 is shown in FIG. 1e.

Figure 1C:
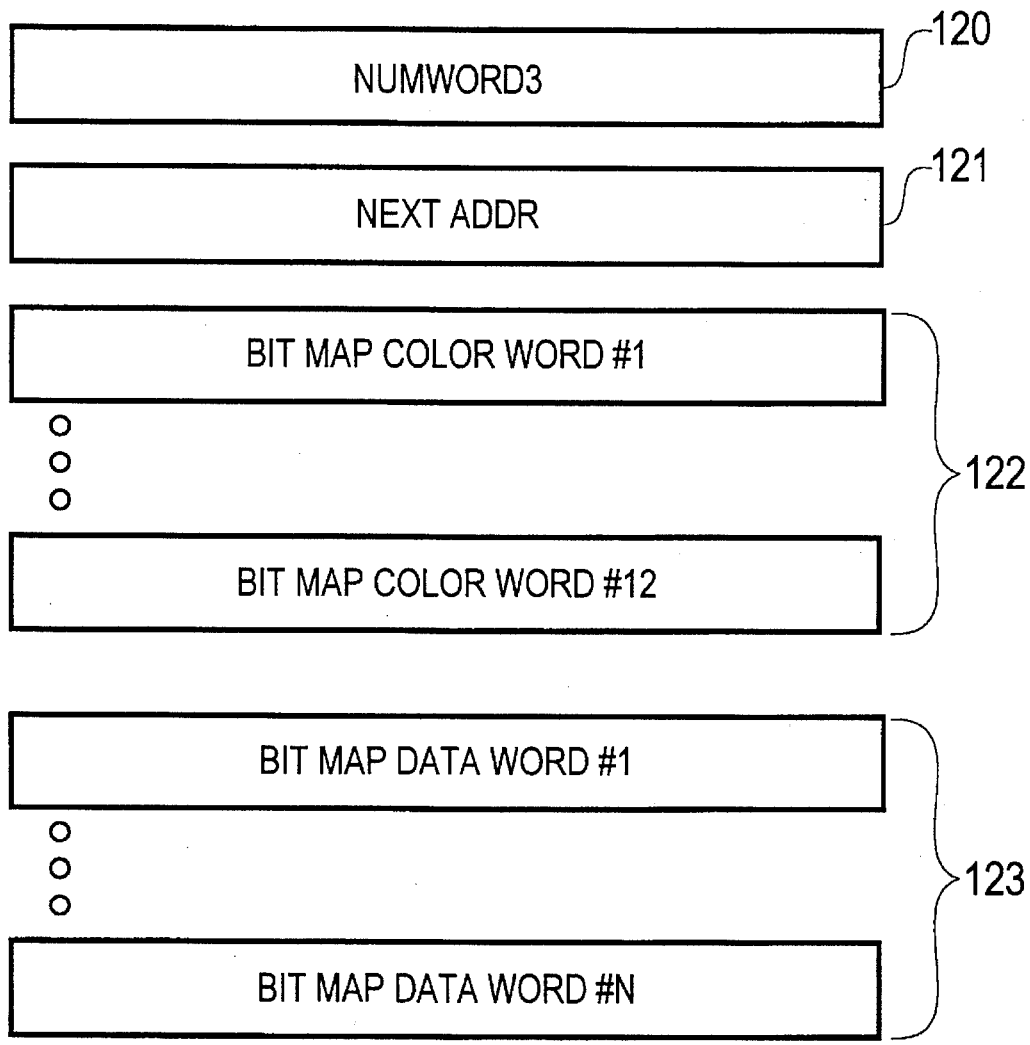
FIG. 1c illustrates the data format 112a of a "bit map", which is one possible data format of an overlay image line data section 112 of FIG. 1b.

FIG. 1c shows data format 112a, which encodes a group of overlay image lines as a bit map. As shown in FIG. 1c, the first word "numword3" (labelled 120 in FIG. 1c) specifies the number of 16-bit words used in the bit map to represent an overlay image line. Following word 120 is a 16-bit offset value "nextaddr" (labelled 121), which can be added to the address of any line in the current bit map to obtain the address of the same line in the next bit map. The next twelve 16-bit words following word 121 constitutes a color map (denoted generally by reference numeral 122). Color map 122 specifies four "left" and four "right" colors used in the current bit map. Within color map 122, each color is a 24-bit quantity composed of an 8-bit luminance (Y) component and two (U and V) chrominance components. The current bit map, denoted by reference numeral 123, follows color map 122. The size of bit map 123 is given by the product of value 110 ("numline1") and value 120 ("numword3"). In this embodiment, the color of each pixel in the bit map is specified by a 2-bit index for indicating which one of four "left" or "right" colors to be used. The value of the parameter "color switch position", discussed below, determines further whether the a "left" or a "right" color is to selected.

Figure 1D:
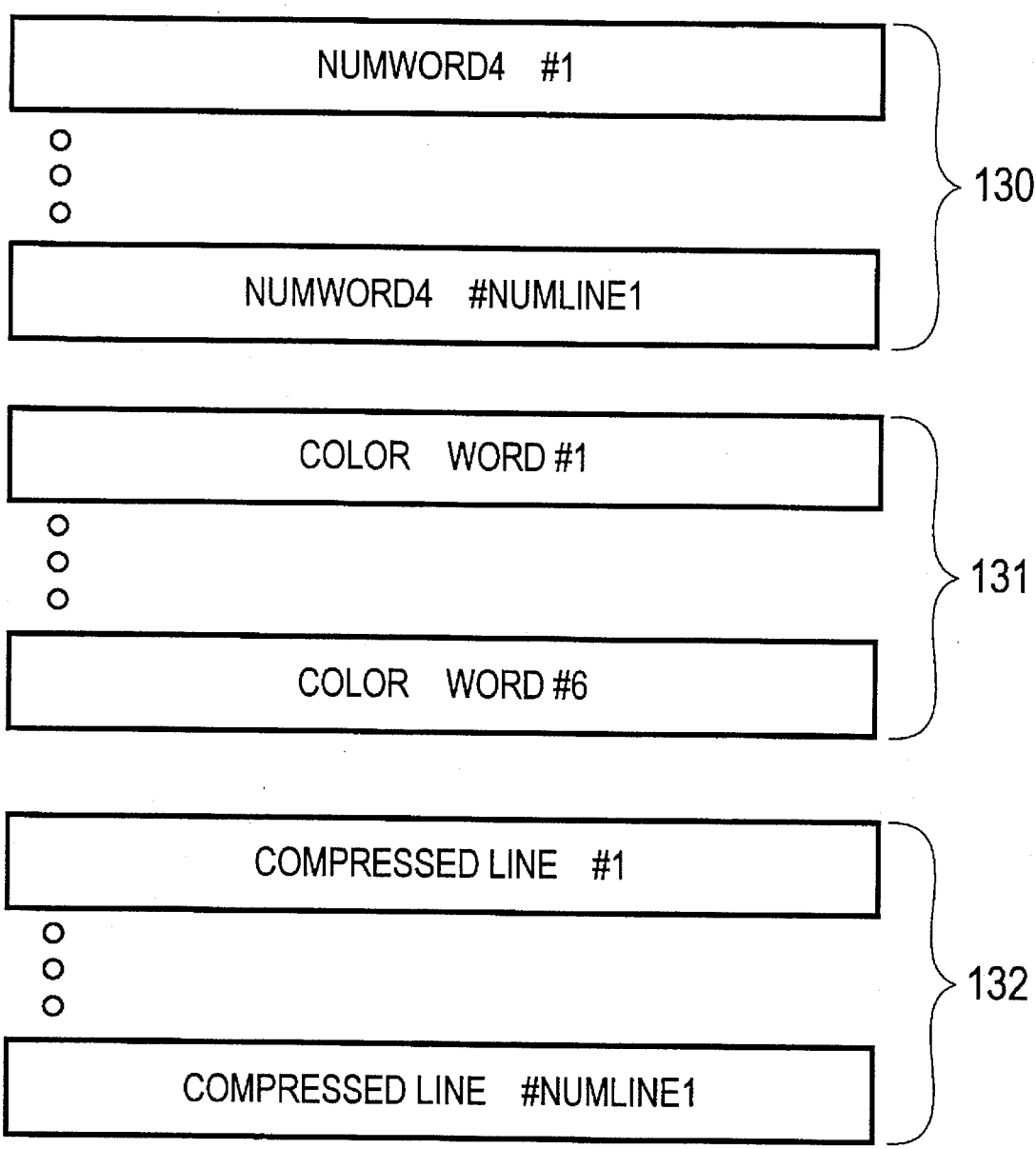
FIG. 1*d* illustrates the data format 112*b* of image data encoded as "compressed lines" which is one possible data format of an overlay image line data section 112 of FIG. 1*b*.
Figure 1E:
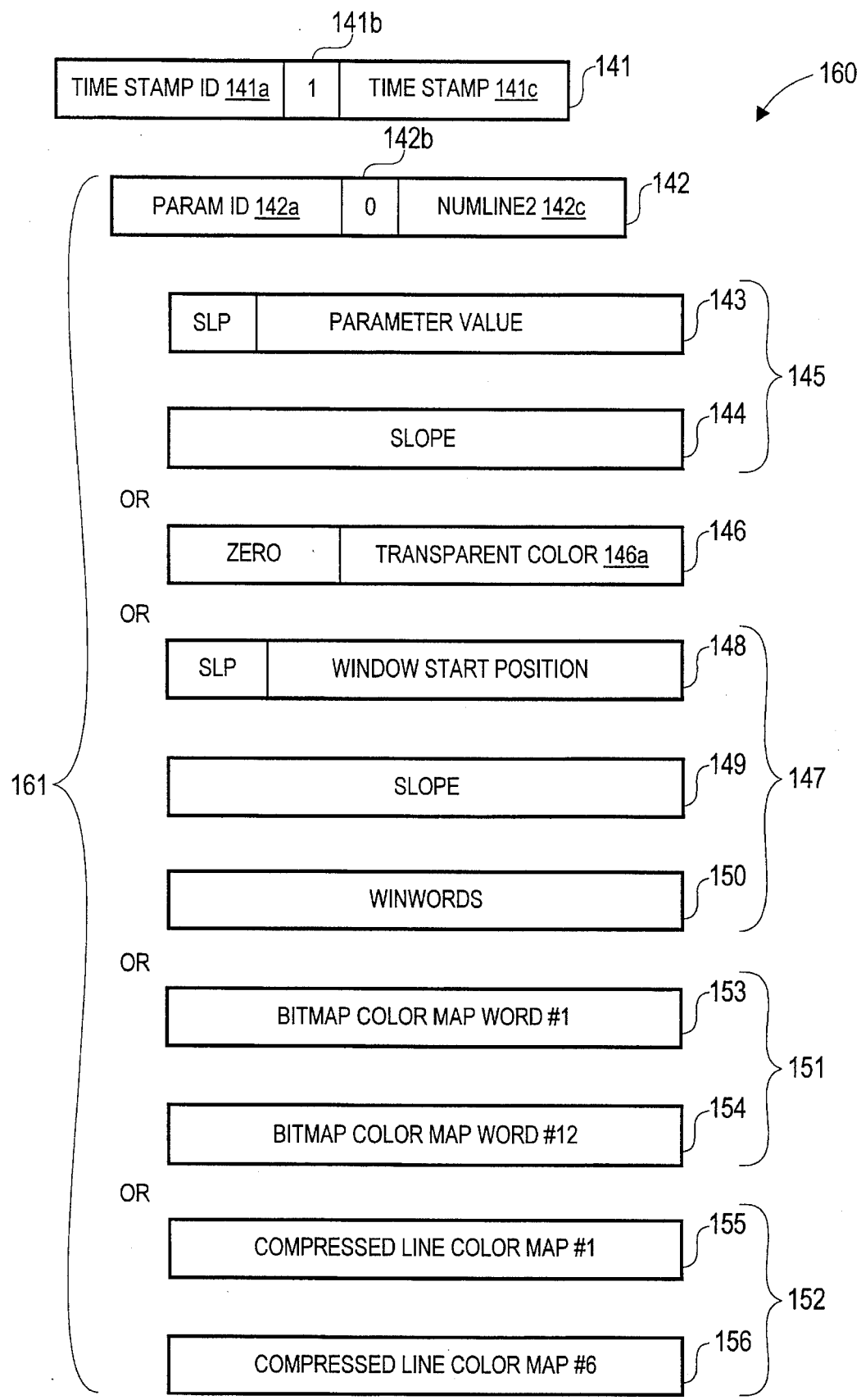
FIG. 1*e* illustrates the data formats of an overlay parameter record 160 of an overlay image.

Alternatively, the overlay image lines can be specified in the "compressed lines" data format 112b shown in FIG. 1d. As shown in FIG. 1d, a number of 16-bit words (labelled "numword4", and indicated in FIG. 1d by reference numeral 130) provides the length of each compressed line specified in the current pixel data section. The number of overlay image lines in the current pixel data section is specified by the value of word 110 ("numline1") shown in FIG. 1b. A 6-word color map, indicated generally by reference numeral 131, follows section 130. The coded compressed lines, indicated by reference numeral 132, follows the color map 131. Color map 131 specifies 4 colors, to be used as left text color, right text color, left "shadow" or "outline" color, and right "shadow" or "outline" color. Within color map 132, each color is specified by a 24-bit value, expressed as an 8-bit luminance (Y) component, and two 8-bit chrominance (U and V) components.

Following word 114 are multiple overlay parameter records. The formats of an overlay parameter record 160 is shown in FIG. 1e. The first word in an overlay parameter record is a 15-bit overlay parameter time stamp (shown in FIG. 1e as portions 141a and 141c of word 141). The overlay parameter time stamp indicates the duration for which the present overlay parameter record is effective. In each overlay parameter record, the overlay parameter time stamp is followed by multiple parameter specification records.

In FIG. 1e, reference numeral 161 denotes a parameter specification record. The first word in a parameter specification record, illustrated by word 142 of FIG. 1e, includes (a) a 7-bit parameter identity (142a); (b) a 1-bit marker (142b), which indicates whether the current parameter specification record is the last parameter specification record in the current overlay parameter record, and (c) an 8-bit value (142c), which indicates the number of lines in each field to which the current parameter specification record is applicable. Parameter identity 142a identifies the parameters specified, and hence determines the format of the parameter specification record. In this embodiment, the parameter specification record can have one of 5 formats 145, 146, 147, 151 and 152.

Format 145 can include one or two words. The first word, labelled 143, includes a "slope" bit and a parameter value. The parameter value under format 145 can be (a) a "horizonal start position", (b) a "color switch position", (c) a "fade factor", or (d) a "number of lines to skip". The horizontal start position value indicates, in each line, the horizontal position of the first non-transparent pixel. By specifying a value for the "horizontal start position" parameter, the lead transparent pixels of each line need not be coded. The "color switch position" parameter specifies the first pixel position at which the "right" colors are used. The "fade factor" which is discussed in further detail below, is used to create a "fade" special effect for the overlay image. The "number of lines to skip" parameter specifies a number of lines in the video image to skip. Skipping video image data can be used to move overlay data vertically on the display. If the slope bit is set, the value of the parameter changes during the time period for which the overlay parameter record is valid, in accordance with the slope value specified in word 144. The slope value is added to the value of the parameter at every display period.

Format 146 is used to specify an 8-bit transparent bit mask (146a). The transparent bit mask specifies one or more colors in the color map to be overridden by the transparent color. The transparent bit mask can be used to slowly reveal a section of an overlay image. For example, if a left color is made visible and a right color is made transparent by the transparent bit mask, the overlay image can be slowly unveiled by moving the "color switch position". When the overlay image is expressed as a bit map, each bit of the 8-bit transparent bit mask corresponds to one of the four left and the four right colors. If the overlay image is represented as compressed lines, where antialiasing is used (see discussion below), the bits of the 8-bit transparent bit mask correspond to the left and right shadow and text colors, and the left and right blended colors. In this embodiment, two blended colors can be obtained on either side of the color switch position: (i) by blending the text color with the shadow color at the boundary between the text and the shadow, and (ii) by blending the shadow color with the underlying decoded video image, at the boundary between the decoded video image and the shadow color.

Format 147 is used to provide a value for a "window start position" parameter. The "window start position" parameter specifies an overlay image confined to a specific window area. Format 147 is similar to format 145 in that a slope value (149) is provided to move the window in a horizontal direction. In addition, a value "winwords" (word 150) is provided to specify the number of pixels to be displayed, in 8-pixel units.

Formats 151 and 152 are used to load the current color map. If the overlay image is provided in bit map format, a 12-word bit map color map (words 151) is provided. Alternatively, if compressed lines are used in the current overlay image, a 6-word color map (words 152) is used.

In this embodiment, an antialiasing step is performed at the boundaries between a text color ("$L_0$", index 0) and a shadow color ("$S_0$", index 4), and between the boundary of a shadow color and a color of the underlying video image ("M", index 8). At the boundary between a text color and a shadow color, the antialiasing step provides three pixels of different colors resulting from blending in different proportions the text and shadow colors. Likewise, at the boundary between a shadow color and the video image, the antialiasing step provides three pixels of different colors resulting from blending different proportions the shadow and the video images. These pixels are represented in the compressed lines data format discussed above. In the present embodiment, the intermediate colors are generated by the decoder. Specifically, the intermediate colors $L_1$, $L_2$, and $L_3$ (indices 1–3) between a text color $L_0$ and a shadow color $S_0$, and the intermediate colors $S_1$, $S_2$, and $S_3$ (indices 5–7) between a shadow color $S_0$ and a color M (index 8) of the video image are generated according to the antialiasing equations, for i=1, 2, and 3:

$$L_i = \frac{(4-i)}{4} * L_0 + \frac{i}{4} * S_0 \qquad (1)$$

$$S_i = \frac{(4-i)}{4} * S_0 + \frac{i}{4} * M \qquad (2)$$

Thus, although only four colors are specified in the color map when the "compressed lines" data format is used, nine colors are used on each side of the color switch position: text, shadow, three blended colors between the text and the shadow color, three blended colors between the shadow color and the underlying pixel of the decoded video image, and "transparent".

Figure 3:
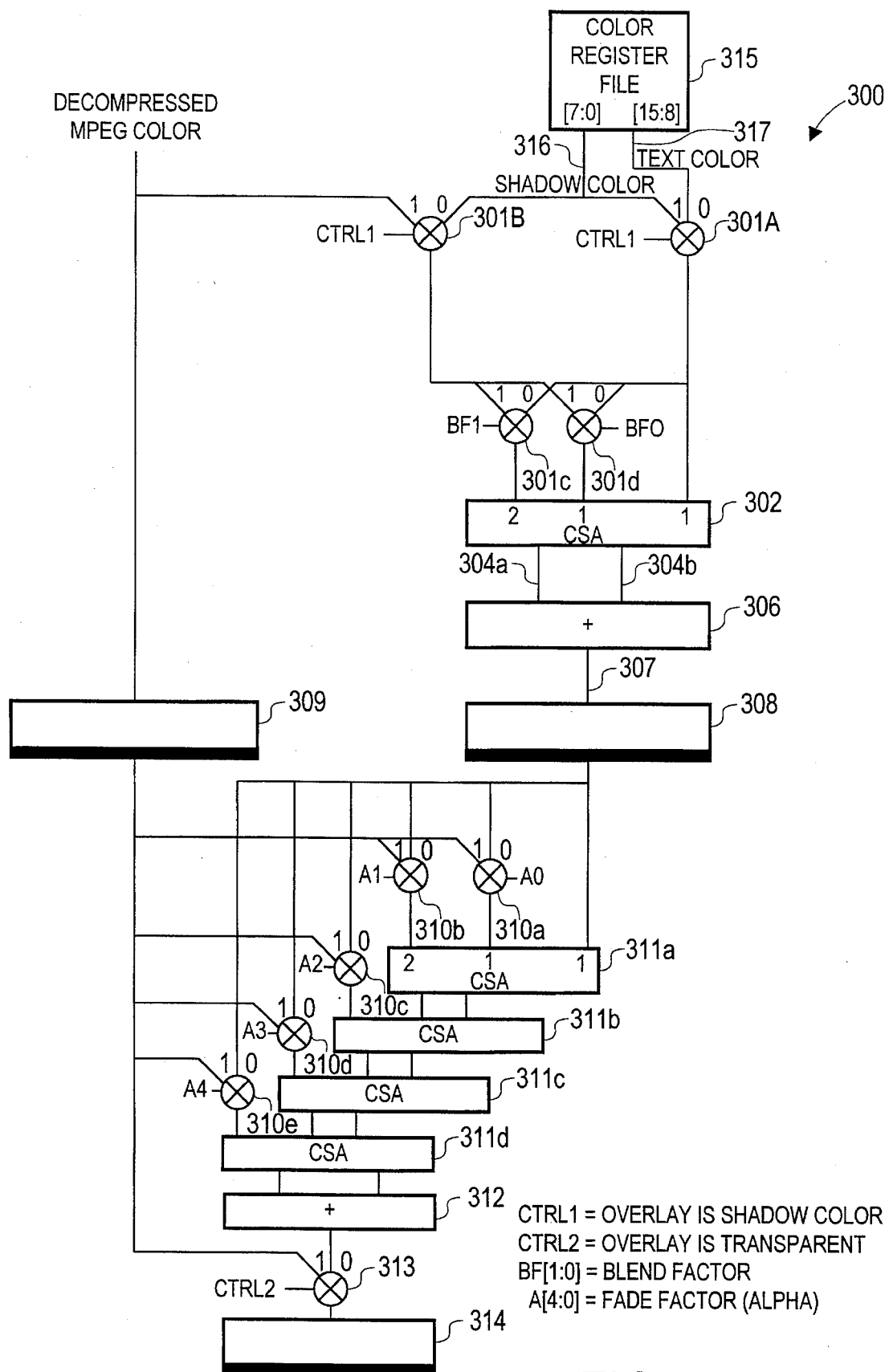
FIG. 3 is a schematic diagram of a circuit 300 suitable for implementing the color blending steps in accordance with the present invention.

In addition to the antialiasing step, a 5-bit fade factor $\alpha$ can be specified in an overlay parameter specification record, as discussed. By changing this fade factor over a period of time during the display interval, the antialiased overlay image can be "faded in" or "faded out" of the video image. During decoding, the color $P_{out}$ generated for a pixel of color $P_{in}$ in the overlay image is provided by the equation:

$$P_{out} = \alpha * M + (1-\alpha) * P_{in} \qquad (3)$$

where M is the color of the corresponding pixel in the video image underlying the pixel of color $P_{in}$ in the overlay image. FIG. 3 is a schematic diagram of a circuit 300 suitable for implementing color blending in accordance with the present invention.

As shown in FIG. 3, circuit 300 includes a register file 315, which provides two 8-bit read ports 316 and 317, and one 16-bit write port (not shown). The chrominance and luminance components of a predetermined number of possible text and shadow colors are loaded via the write port into the left and right halves of register file 315, respectively. Read port 316 can be used to retrieve an 8-bit luminance or chrominance component of a shadow color, and read port 317 can be used to retrieve an 8-bit luminance or chrominance component of a text color. To compute a chrominance or luminance component of a pixel in the overlay image, the corresponding 8-bit chrominance or luminance components for the text and shadow colors are retrieved simultaneously at read ports 316 and 317.

Under compressed line mode, read port 316 is addressed by a 5-bit value, consisting of (i) a 2-bit value YUV[1:0], which indicates which of the chrominance and luminance components is accessed; (ii) a 2-bit value stored in a "shadow color register"; and (iii) a 1-bit value indicating whether the left shadow color or the right shadow color is desired. Under compressed line mode, read port 317 is addressed by a similar 5-bit value consisting of (i) the same 2-bit value YUV[1:0]; (ii) a 2-bit value stored in a "text color register"; and (iii) a 1-bit value indicating whether the left text color or the right text color is desired. Under bit map mode, read port 317 is accessed by a 6-bit value consisting of (i) the 2-bit value YUV[1:0]; (ii) a 2-bit value, which is received from the bit map, designating a color; and (iii) a 1-bit value indicating whether the left text color or the right text color is desired. No shadow color is accessed under bit map mode.

Multiplexers 301a, 301b, 301c and 301d operate to select the appropriate text, shadow and transparent colors as input values to weighted carry-save adder 302. Under bit map mode, multiplexers 301c and 301d are both set to select the text color. Weighted carry-save adder 302 provides output values "sum" and "carry" at terminals 304a and 304b from input values a, b and c received from input terminals 303a, 303b and 303c, respectively. The functional relationship between the input values a, b, and c, and the output values "sum" and "carry" are provided by:

$$\text{sum} = a \veebar b \veebar c$$

$$\text{carry} = ab + bc + ac$$

where $\veebar$ is the "exclusive-or" operator. The resulting output values "sum" and "carry" are then summed and normalized in adder 306. Normalization is achieved by shifting the output value at terminals 307 by two bits. In this manner, any of the 9 colors used in the overlay image can be obtained. For example, to provide the blended color of index 3, the shadow color is provided at both input terminals 303a and 303b, and the text color is provided at terminal 303c. The output value at terminals 307 is latched into a pipeline register 308. Another pipeline register 309 is provided to latch the corresponding pixel in the underlying video image. The output values of registers 308 and 309 are selected by multiplexers 310a–310e, which are controlled by the 5-bit fade factor α to provide the appropriate mix of the anti-aliased pixel in register 308 with the corresponding pixel of the underlying video image at in register 309 at the input terminals of weighted carry-save adders 311a–311d configured as a carry-save adder tree. The output value of weighted carry-save adder 311d is summed in adder 312 to provide the final blended pixel output value, in accordance with equation (3) above. Multiplexer 313 allows the final blended pixel output of adder 312 to be overridden by a transparent pixel taken from register 309. The output value of multiplexer 313 is latched into register 314.

Figure 4:
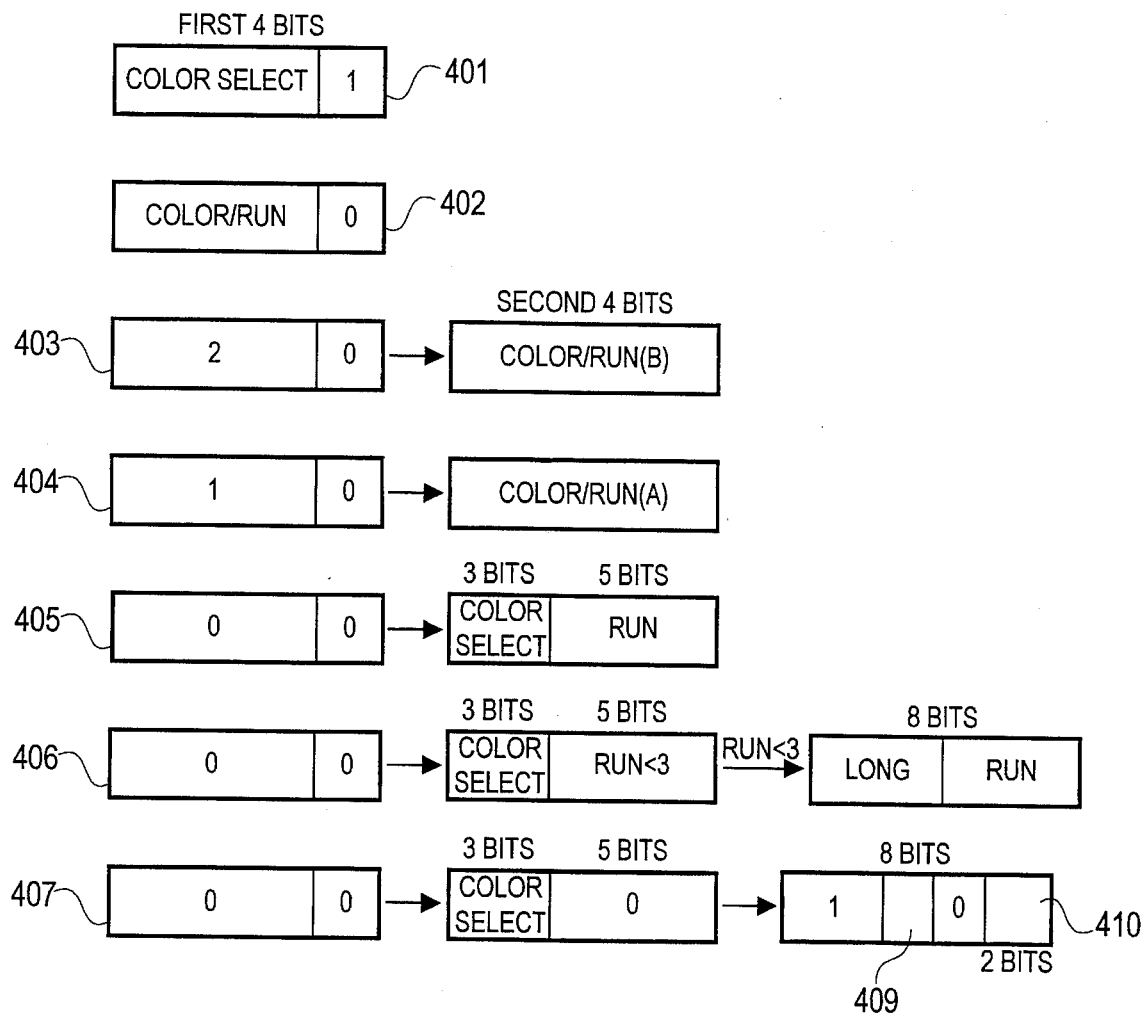
FIG. 4 shows seven symbol formats 401–407 for encoding an overlay image as groups of compressed lines.

A compressed line in the present embodiment is encoded under a lossless run-length coding method. Under a run-length coding method, a run of pixels having the same color is coded as a symbol representing a color and a run length. Thus, two adjacent symbols cannot have the same color. As discussed above, each pixel can be one of nine colors on each side of the color switch position. The present invention provides that each compressed line is coded as a sequence of symbols. In this embodiment, there are six symbol formats. The symbol formats, labelled 401–407, are shown in FIG. 4. As shown in FIG. 4, symbol formats 401–402 are each four bits long, symbol formats 403–404 are each eight bits long, symbol format 405 is twelve bits long and symbol formats 406 and 407 are each twenty bits long. The maximum run length under this coding method is 768, which is longer than the expected number of pixels in a line under either the SIF or the CCIR 601 video format. Under the present invention, the text color and the blended text colors are assigned indices 0–3, the shadow colors and the blended shadow colors are assigned indices 4–7 and the transparent color is assigned the index 8.

Symbol format 401 is identified by a '1 bit in the least significant bit. Symbol format 401 encodes a single pixel. The first three bits of symbol 401 is a 3-bit color select field. A 3-bit color select is sufficient to determine the next color because no two adjacent symbols encode the same color—for each color, there are only eight possible colors which are eligible as the next color. The next color is determined by the algorithm shown in FIG. 5a.

Figure 6:
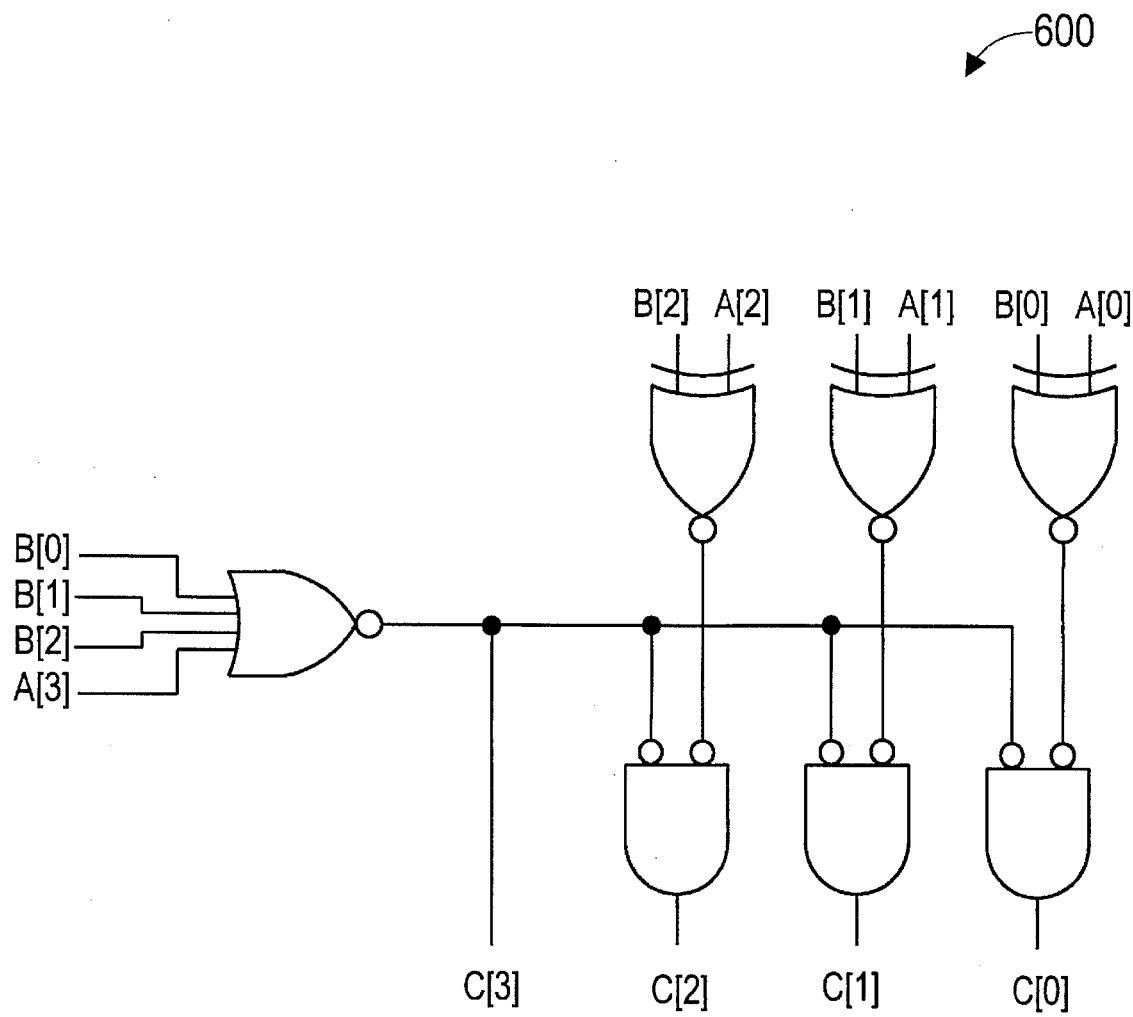
FIG. 6 is a logic circuit 600 suitable for implementing the color select algorithm of FIG. 5*a*.

In FIG. 5a, each color is represented by its 4-bit index. Since the indices for the text and shadow colors are less that 8, the most significant bit for each index is '0. The index for the transparent color has the most significant bit of '1. For example, as discussed above, the unblended shadow color has index 4, which is provided in 4 bit as '0100. Thus, in FIG. 5a, the text and shadow colors are shown as 0,A[2:0] and the transparent color is shown as 1000. The 3-bit color select code is shown as B[2:0]. As shown in FIG. 5a, if the present color is not transparent and the color select is '000, the transparent color is next selected. If present color is not transparent, then next color is selected by the bit pattern 0,A[2:0] $\underline{\vee}$ B[2:0], where $\underline{\vee}$ represents the "exclusive-or" operation. If the present color is the transparent color, the next color is selected by the bit pattern 0,B[2:0]. The color select bit pattern can be obtained by a bit-wise exclusive-or of the next color and the present color. A suitable logic circuit 600 for implementing the algorithm of FIG. 5a is shown in FIG. 6.

Referring back to FIG. 4, symbols 402–407 are each identified by a '0 least significant bit in the first four bits. To distinguish symbols 402–407, the most significant 3 bits of the first four bits are decoded according to the decoding table of FIG. 5b. For example, the most significant three bits of symbol format 402 have a value between 3 and 7, inclusive. Thus, symbol format 402 encodes 2 to 4 pixels of shadow color 4, or blended shadow colors 6 and 7. If the value of the first three bits is either 1 or 2, the symbol is an 8-bit symbol of either symbol format 403 or symbol format 404. Decoding of symbol format 403 or symbol format 404 is achieved in accordance with the decoding table shown in FIG. 5c. In FIG. 5c, symbol formats 403 and 404 are decoded according to columns 540 and 541 respectively. For example, if the first four bits of a given symbol is found to be of symbol format 403, and the value of the second four bits is 12, then the symbol is decoded to be a run of five pixels having the shadow color (color index=4). As shown in FIG. 5c, the symbols of symbol formats 403 and 404 each encode at least two pixels. All runs of less than three pixels are encoded under symbol formats 401–404.

If the value of the first three bits of a symbol is zero, the symbol can be of either symbol format 405 (12-bit symbol) or one of symbol formats 406 and 407 (20-bit symbol). In a symbol under either symbol format 405 or one of symbol formats 406 and 407, the eight bits following the first four bits has a 3-bit color select field and a 5-bit run field. The 3-bit color select field operates on the present color in the same manner as discussed above with respect to color selection under symbol format 401. If the 5-bit run field has a value greater than three, then the symbol is a symbol under symbol format 405, and the value of this 5-bit run field is the length of the run of pixels. Otherwise, the symbol is a 20-bit symbol under either symbol format 406 or symbol format 407. Under symbol format 406, the two least significant bits of the 5-bit run field and the last 8 bits of the symbol form a 10-bit run field. Under symbol format 406, the 10-bit run field a value exceeding or equaling 31. Under symbol format 406, the length of the pixel run is given by the value of this 10-bit run field plus one. Thus, symbol formats 401–405 encodes pixel runs up to 32 pixels, and symbol format 406 encodes pixel runs up to 768 pixels. Alternatively, if a symbol read decoded under symbol format 406 has a value in the 10-bit run field less than 31, the symbol is encoded under symbol format 407. Symbol format 407 encodes a "color change" symbol[2]. The color change symbol reloads either the text color register or the shadow color register. Under symbol format 407, bit 409 (i.e. the most significant bit of the least significant four bits of the 10-bit run field) specifies whether the shadow color register or the text color register is to be reloaded. In this embodiment, a color change symbol for a text color change has bit 409 set to '0 and a color change symbol for a shadow color change has bit 409 set to '1. 2-bit field 410 (i.e. the least significant two bits of the 10-bit run field) encodes one of four text colors or one of four shadow colors. In this embodiment, color change occurs over five pixels, so that the "color change" symbol also represents a run length of five and a color selected by the color select field (i.e. the most significant three bits of the second four bits in the 20-bit color change symbol) in conjunction with the most recent color.

[2] The color change symbol, which allows text and shadow changes within a line, is especially useful in karaoke application, where some songs are sung by two or more voices (e.g. a male voice and a female voice). In that application, a label indicating the voice can be given one text color, and the lyrics assigned to that voice is provided a new text color. The new text color is effectuated by the use of a color change symbol.

Under the encoding scheme discussed above, the worst case compressed line is compressed at 4-bit per pixel. Occurrence of the color change symbol does not worsen compression performance, since each 20-bit color change symbol also represents a run of 5 pixels. In practice, the compression achieved is substantially higher than the worst case, typically at 0.6 bits per coded pixel. In this embodiment, because of the color selection algorithm, the first pixel of the overlay image is set to be an invisible pixel one left of the first pixel in the decoded video image, so that color initialization is simplified by setting this invisible pixel conveniently to an unlikely color. Accordingly, the color of the first pixel in each line is reset to the unlikely color '1', which is a blend of text and shadow color. In the rare event that the color '1' is actually desired of the first visible pixel in the image overlay, the invisible pixel left of the video image is set to the transparent color. Alternatively, if the "horizontal start position" parameter is used, the horizontal start position parameter is set to one less than the first visible overlay pixel. The pixel at the horizontal start position is then assigned the transparent color.

If an error occurs in the overlay image record an objectionable image may result, unless the error is properly handled. The "numword2" (word 108 of FIG. 1a) allows skipping over overlay images rapidly when an error is discovered in an overlay image. When an error occurs in a bit map or a compressed line, other ways of error handling exist. In a bit map, for example, the error typically affects only a single pixel, so that the error is best handled by ignoring it. If an error occurs in a compressed line, however, the error can be overwritten by a string of 32 zeroes. When such a string of zeroes is detected, the remaining of the compressed line can be rendered transparent. Alternatively, the decoder can place a impermissible bit pattern (e.g. 16 consecutive bits of zero at the beginning of each line) to signal the central processing unit that an error has occurred. In an interlaced video display system, for example, if an error occurs in one line in one field of the video image, an adjacent line from the other field can be used to substitute for the corrupted line.

Figure 7:
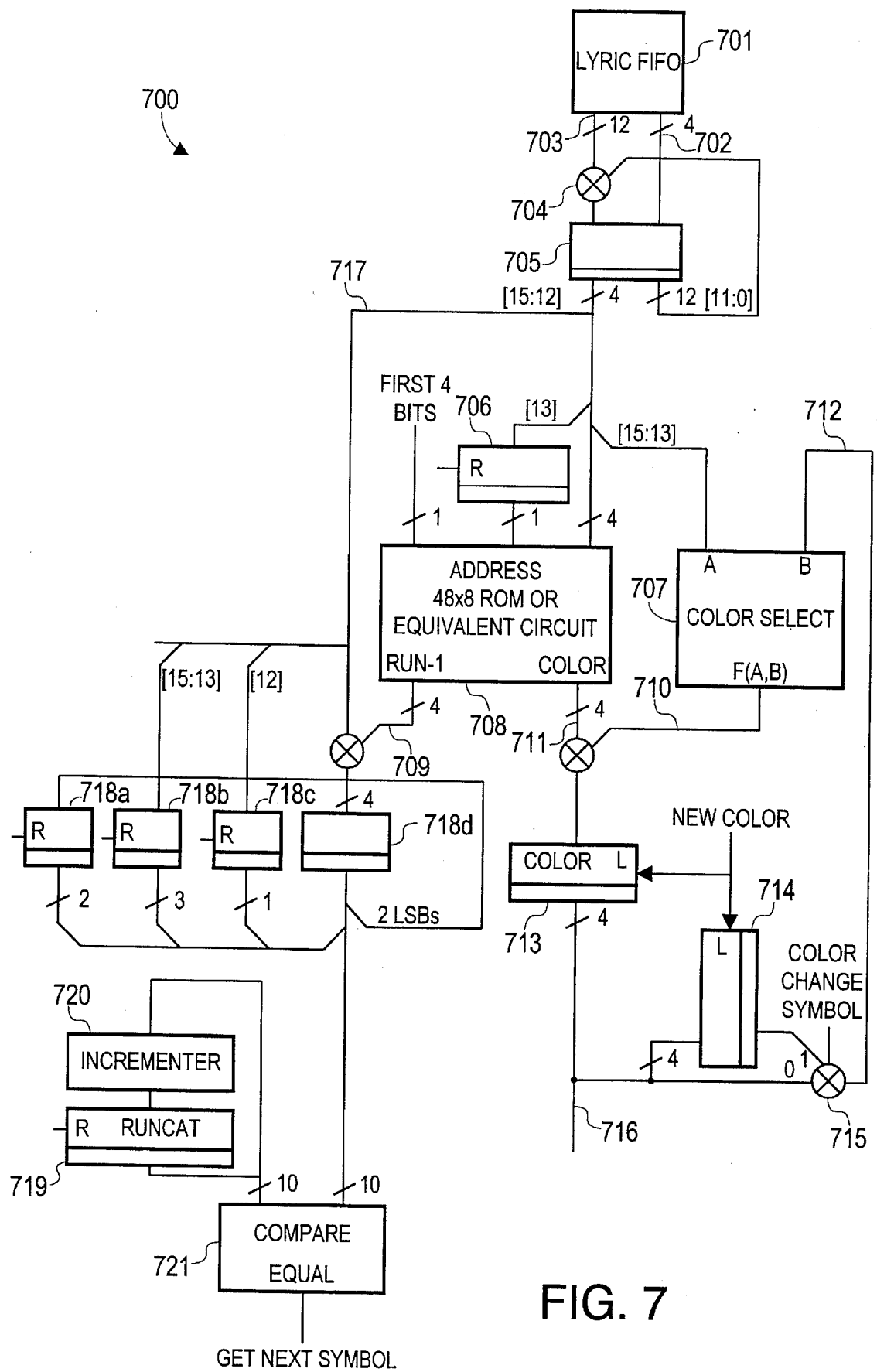
FIG. 7 is an implementation 700 of a decoding circuit for symbol formats 401–407, shown in FIG. 4.

FIG. 7 shows an implementation 700 of a decoder for symbol formats 401–407. As shown in FIG. 7, 16-bit compressed lines are provided to a first-in-first-out memory (FIFO) 701. Multiplexer 704 selects for loading into register 705 either an output 16-bit word from FIFO 701, or the least significant 12 bits of the current content of register 705. This arrangement allows an output word of FIFO 701 to be provided on output terminals 717 of register 705 four bits at a time. When the 4-bit word at terminals 717 contains a 3-bit color select value as its most significant three bits, e.g. under symbol format 401 (first 4 bits), or any of symbol formats 405–407 (second 4 bits), the color select value is provided to color select circuit 707. Color select circuit 707, which can be implemented by circuit 600 of FIG. 6, operates on the current color value on terminals 712 to provide the next color value at terminals 710. The current color value at terminals 710 is stored in register 713. The present color value is also preserved in register 714, which is used when the current symbol is decoded to be a color change symbol.

Alternatively, when the 4-bit output value at terminals 717 encodes a color a run value, e.g. under symbol format 402 (first 3 bits) or one of symbol formats 403 and 404 (second four bits), look-up tables stored in ROM 708 are used to decode the color value and the run length. Register 706 stores the second least significant bit of the first 4 bits, when symbol format 403 or 404 is detected, so as to select either the table of column 540 or the table of column 541 (FIG. 5c) when decoding the next four bits.

When the 4-bit datum at terminals 717 is part of a run length specification, e.g. under symbol formats 405 and 406, the run length is shifted four bits at a time until all bits in the run length are loaded into a 10-bit run length register 718. Run length register 718 is formed by 2-bit register 718a, 3-bit register 718b, 1-bit register 718c and 4-bit register 718d. A run count register 719 is provided to keep track of the number of pixels output. When a new symbol is received, run count register 719 is reset, and incremented by incrementer 720 when each pixel is output, until comparator 720 detects that the specified run length in register 718 equals the run count in run length register 719. Comparator 720 generates a control signal indicating readiness for the next symbol.

The above detailed description is provided to illustrate the specific embodiments of the present invention and not to be taken as limiting. Numerous variations and modifications within the scope of the present invention are possible. The present invention is defined by the following claims.

I claim:

1. A system for superimposing a lyrics overlay image on a video image, comprising:
    a first input circuit for receiving a first data stream of symbols, said symbols encoding pixels of said lyrics overlay image by reference to a color map;
    a second input circuit for receiving a second data stream including color intensity values of pixels of said video image;
    a decoding circuit receiving said first data stream of symbols and providing a third data stream including color intensity values of said pixels of said lyrics overlay image, said color intensity values in said third data stream corresponding to color intensity values corresponding to colors specified in said color map;
    an image blending circuit receiving said second and third data streams, said image blending circuit providing a fourth data stream including weighted sums of color intensity values in said second and third data streams.

2. A system as in claim 1, wherein each of said symbols of said first data stream encodes pixels in said lyrics overlay image as a color selected from said color map and a run length specifying the number of consecutive pixels having said selected color.

3. A system as in claim 2, wherein said symbols are of unequal lengths.

4. A system as in claim 1, wherein said image blending circuit receives (i) a first color intensity value corresponding to a shadow color; and (ii) a second color intensity value corresponding to a text or background color, said image blending circuit deriving color intensity values using weighted averages of said first and second color intensities received.

5. A system as in claim 1, where said image blending circuit further receives a fade factor, said blending circuit providing as output values color intensity values which are weighted sums of said pixels of said video image and said pixels of said overlay lyrics image in accordance with the value of said fade factor.

6. A method for encoding in a data stream a sequence of items using n-bit symbols, each item being selected from a group of $2^n+1$ items, said method comprising the steps of:
    assigning an index to each item, except a designated item, each index being one of the bit patterns '$0a_{n-1}a_{n-2}\ldots a_0$, where each of said $a_i$'s take on values '0 or '1, i being an index between 0 and n−1, inclusive;
    assigning a designated index to said designated item, said designated index being the bit pattern '$1b_{n-1}b_{n-2}\ldots b_0$, where each of said $b_j$'s takes on the value '0, j being an index between 0 and n−1, inclusive; and
    designating one of said items as an initial item, and providing in said data stream, (i) for each item in said sequence, other than said designated item, a symbol having the value of the least significant n bits obtained by a bitwise exclusive-or operation using the index of said item and the index of the immediately preceding item, using said initial item as the first immediately preceding item; and (ii) for each occurrence of said designated item in said sequence, a designated symbol being the bit pattern $b_{n-1}b_{n-2}\ldots b_0$, where each of said $b_j$'s takes on the value '0, j being an index between 0 and n−1, inclusive.

7. A method for decoding in said data stream said sequence of items encoded in accordance with the method of claim 6, said method for decoding comprising the steps of:
    receiving said data stream and retrieving from said data stream said symbols; and recovering said sequence of items from said data stream, said recovering step includes the steps of (i) obtaining the index of each symbol, other than said designated symbol, by applying a bitwise exclusive-or operation of said symbol with the least significant n bits of the index of the immediately preceding item, using said initial item as the first immediately preceding item; and (ii) for each designated symbol, obtaining (a) where the immediately preceding item is not said designated item, the index of said designated item, or (b) the index of said designated symbol, by applying a bitwise exclusive-or operation of said designated symbol with the least significant n bits of the index of the immediately preceding item.

8. A method for superimposing a lyrics overlay image on a video image, comprising the steps of:

receiving a first data stream of symbols, said symbols encoding pixels of said lyrics overlay image by reference to a color map;

receiving a second data stream including color intensity values of pixels of said video image;

decoding said first data stream of symbols in accordance with said color map, by obtaining from said color map color intensity values of said pixels of said lyrics overlay image and providing said color intensity values in a third data stream; and blending pixels of said overlay lyrics image and pixels of said video image by providing, in a fourth data stream, weighted sums of color intensity values in said second and third data streams.

9. A method in claim 8, wherein each of said symbols of said first data stream encodes pixels in said lyrics overlay image as a color selected from said color map and a run length specifying the number of consecutive pixels having said selected color.

10. A method in claim 9, wherein said symbols are of unequal lengths.

11. A method as in claim 8, where said blending step includes the step of receiving (i) a first color intensity value corresponding to a shadow color; and (ii) a second color intensity value corresponding to a text or background color, said blending step deriving color intensity values using weighted averages of said first and second color intensities received.

12. A method as in claim 8, where said blending step further includes the step of receiving a fade factor, said blending step providing as output values color intensity values which are weighted sums of said pixels of said video image and said pixels of said overlay lyrics image in accordance with the value of said fade factor.

13. A method for providing a video overlay over an image, said video overlay and said image represented by first and second multiplicities of pixels, respectively, said method comprising:

storing a first index, said first index indicating a text color stored in a color map;

storing a second index, said second index indicating a shadow color stored in said color map;

storing a first color code representing a color of a current pixel in said first multiplicity of pixels;

receiving a symbol of a first symbol type, said symbol of said first symbol type encoding both a second color code, representing a next color in said first multiplicity of pixels, and a run length value representing a number of pixels having said next color;

obtaining said second color code using said first color code of said current pixel and a predetermined function;

obtaining intensities of said next color by accessing said color map using said second color code, and said first and second indices; and displaying said intensities of said next color in place of a corresponding pixel in said second multiplicity of pixels.

14. A method as in claim 13, wherein said symbol is of variable length.

15. A method as in claim 13, wherein said steps of storing said first and second indices comprise the step of storing said first index in a text color register and the step of storing said second index in a shadow color register, respectively; and wherein said method further comprising the step of receiving a symbol of a second symbol type, said symbol of said second symbol type specifying reloading of either said text color register or said shadow color register by a third index.

16. A method as in claim 15, wherein said first and second multiplicities of pixels are organized in corresponding lines, said step of receiving said symbol of second type allows reloading of said text color register or said shadow color register at any one of numerous locations in said corresponding lines of pixels.

17. A method as in claim 13, wherein said color map being implemented to allow reloading of said color map for any of said corresponding lines of pixels.

18. A method as in claim 16, further comprising:

detecting if an error occurred in said symbol of said first symbol type; and replacing said symbol of said first symbol type by, when said error is detected in a line of pixels in said first multiplicity of pixels, a symbol of a third symbol type, said symbol of said third symbol type directing said method to display, for remaining pixels in said line of pixels in said first multiplicity of pixels, pixels in a corresponding line of said second multiplicity of pixels.

19. A method as in claim 18, wherein a symbol of said third symbol type is distinct from symbols of said first and second symbol types.

20. A method as in claim 18, further comprising the steps of:

marking said line of pixels in said first multiplicity of pixels, when said replacing step is performed; and displaying a corresponding line of pixels in said second multiplicity of pixels, when said image is next displayed.

21. A method as in claim 13, wherein said second color code encodes a blending factor, and wherein said step of obtaining intensities of said next color comprises the steps of:

obtaining from said color map a text color in accordance with said first index;

obtaining from said color map a shadow color in accordance with said second index;

obtaining a background color; and providing as said intensities a weighted average, weighted by said blending factor, of either (i) said text color and said shadow color; or (ii) said shadow color and said background color.

\* \* \* \* \*